May 22, 1956  F. D. FELTON ET AL  2,746,827
COOKERS OR REFRIGERATORS
Filed Dec. 18, 1953

# United States Patent Office 2,746,827
Patented May 22, 1956

2,746,827
COOKERS OR REFRIGERATORS

Frederick Dudley Felton, Springsfield, Belbroughton, and Joshua Howard Bissell, Wombourne, England, assignors to Revo Electric Co. Limited, Tipton, England, a British company Application December 18, 1953, Serial No. 399,124

1 Claim. (Cl. 312—214)

This invention has reference to improvements relating to cookers or refrigerators of the kind which incorporate one or more ovens or compartments to which access can be gained through a door or doors on the front of an outer shell, said ovens or compartments being of open fronted, box-like form and being spaced from the outer shell on all sides with the exception of the front thereby providing space for legging or heat insulation.

The object of the present invention is to provide a simple means of manufacturing the outer shell and interconnecting therewith the ovens or compartments.

The invention consists of an improved cooker or refrigerator of the kind referred to wherein the front panel of the outer shell is formed of sheet metal having an aperture formed therein which is surrounded by a rearwardly directed integral flange and wherein a forward edge or edges of an open fronted oven or compartment is welded to the said rearwardly directed flange.

The invention may further reside in the fact that the sides and at least a portion of the back of the outer shell is formed as an integral part of the front panel.

A convenient embodiment of the present invention will now be described in its application to an electric cooker of the kind incorporating a main cooking oven above which is disposed a compartment for warming plates or the like and to each of which access can be gained through a separate door in the front panel in the outer shell of the cooker.

For a clearer understanding of the present invention reference will be made to the accompanying drawings in which.

Figure 1:
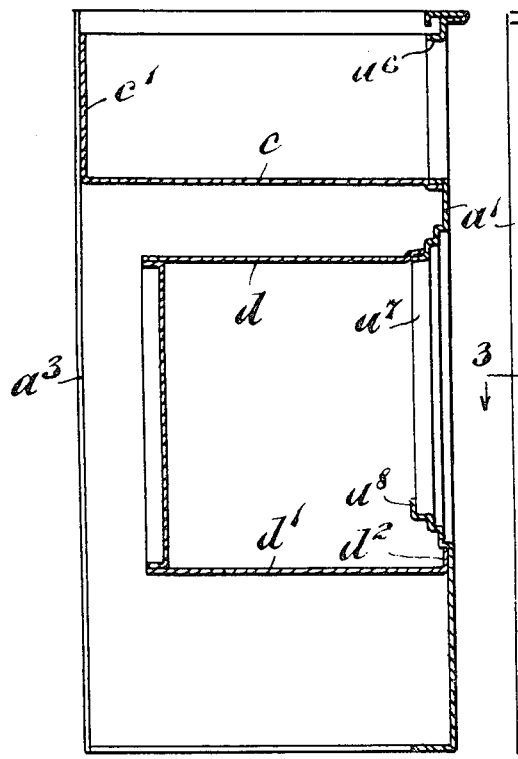
Fig. 1 is a sectional side elevation through the shell of a cooker showing the oven and upper compartment in position.
Figure 2:
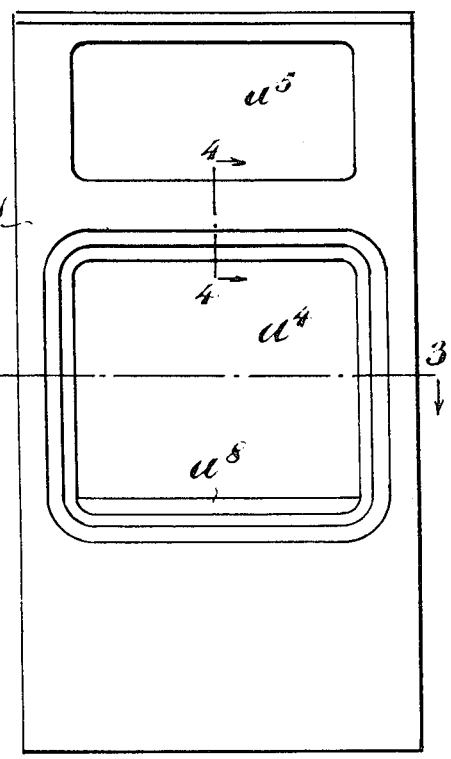
Fig. 2 is a front elevation of the shell.
Figure 3:
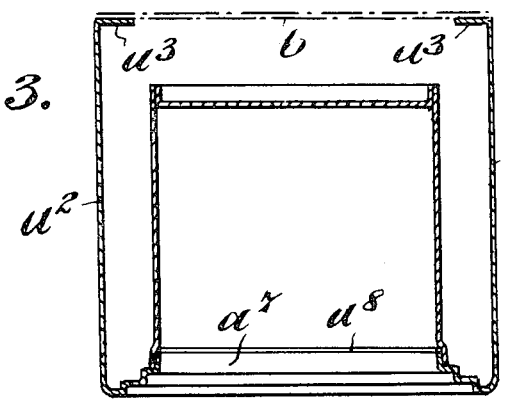
Fig. 3 is a section on the line 3—3 of Fig. 2.
Figure 4:
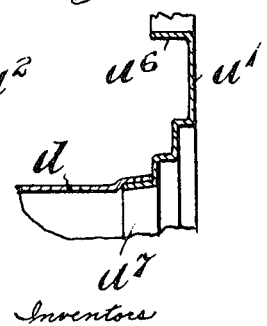
Fig. 4 is a section on the line 4—4 of Fig. 2

The outer shell of the cooker is formed of sheet metal, the middle portion $a1$ whereof forms the front panel of the shell and the ends whereof are bent rearwardly at right angles to form the side walls $a2$ of the shell and then inwardly towards one another to form portions $a3$ of the back panel of the shell. A back plate is subsequently welded or otherwise secured to the inwardly directed portions $a3$, or, alternatively, the two inwardly directed portions $a3$ may be of such a length that they overlap at the centre of the back of the shell and are welded or otherwise secured together down a seam. Before this sheet of metal is bent it is subjected to a pressing operation in which the middle portion $a1$ which is to form the front panel of the shell is pierced to provide two apertures $a4$ and $a5$ of an area substantially equal to the cross sectional area of the front openings of the oven and compartment respectively of the cooker.

During this pressing operation a plane rearwardly directed flange $a6$ is pressed up from the metal surrounding the aperture $a5$ and a stepped flange $a7$ is pressed up from the metal surrounding the aperture $a4$, an upwardly directed lip $a8$ being left on the portion of this flange at the bottom only of the aperture $a4$. To the flange $a6$ is welded a channel cross-section compartment $c$ having a back $c1$ and which is open at the top so that articles placed therein will be subjected to the heat emitted by hot plates carried on the top of the cooker body. To the tread-like portion of the last step of the flange $a7$ at the top and both sides of the aperture $a4$ is welded the rim of an open fronted box-like oven $d$ the bottom of this oven $d1$ being furnished with an upwardly directed flange $d2$ which is disposed below the lower portion of the flange $a7$.

It will be understood that the oven $d$ and compartment $c$ are spaced from the outer shell on all sides with the exception of the front, to which doors are subsequently connected for closing the apertures in the front panel $a1$. The top of the outer shell is closed by a hob in the normal manner.

We claim:

A cabinet for a cooker or refrigerator comprising a front panel and side panels formed from a single sheet of metal, said front panel having an opening therein, there being an inwardly extending stepped flange around the margin of said opening said stepped flange being continuous and being integral with said front panel, and a compartment having a top, a bottom and sides formed of sheet metal and having an open front, the edges of said top and sides that lie along said open front being welded to steps of said inwardly extending stepped flange and the edge of said bottom that lies below said open front having a vertical flange engaging the interior of said front panel and being welded thereto, said compartment being supported entirely by said front panel as a cantilever, the lower side of which is in compression thrusting said vertical flange against said front panel while the upper side of said compartment is in tension.

References Cited in the file of this patent
UNITED STATES PATENTS

| | | |
|---|---|---|
| 1,164,123 | Schaffert | Dec. 14, 1915 |
| 1,543,349 | Walker | June 23, 1925 |
| 2,139,779 | Stratton | Dec. 13, 1938 |
| 2,300,405 | Cook | Nov. 3, 1942 |
| 2,393,879 | Barnsteiner | Jan. 29, 1946 |
| 2,584,886 | Laguzzi | Feb. 5, 1952 |